United States Patent [19]

Siegel

[11] 4,167,122
[45] Sep. 11, 1979

[54] PRESSURE SENSING CELL FOR FORCE-BALANCE TRANSMITTER

[75] Inventor: William A. Siegel, Norristown, Pa.

[73] Assignee: Fischer & Porter Company, Warminster, Pa.

[21] Appl. No.: 951,482

[22] Filed: Oct. 16, 1978

[51] Int. Cl.² ............................................. G01L 7/08
[52] U.S. Cl. ....................................... 73/706; 73/716
[58] Field of Search ................. 73/706, 715, 723, 701, 73/724, 725, 726, 727, 728, 729, 716, 717, 718, 719, 720, 721, 722

[56] References Cited

U.S. PATENT DOCUMENTS 2,883,995  4/1959  Bialous et al. ........................ 73/706

FOREIGN PATENT DOCUMENTS 672879  5/1952  United Kingdom ..................... 73/725

Primary Examiner—Donald O. Woodiel
Attorney, Agent, or Firm—Michael Ebert

[57] ABSTRACT

A self-contained pressure sensing cell responsive to an applied input pressure to produce a force for deflecting the pivoted force beam in the transducer section of a transmitter for converting the pressure into a corresponding signal. The cell includes a housing that is seatable within a well formed in the meter body of the transmitter and communicating with a chamber therein into which the lower end of the beam is extended. The cell housing is divided into a rear section, a mid section and a front section. Disposed within the rear section and integral with the wall thereof at its junction with the mid section is a wafer functioning as a flat sensing diaphragm. The flat diaphragm is provided with a connector pin that projects into the body chamber and is joinable to the beam whereby deflection of the flat diaphragm results in a corresponding beam deflection. Supported within the front section adjacent the mouth thereof is a convoluted barrier diaphragm behind which is a back-up nest seated within the front section. The free space between the face of the nest and the barrier diaphragm communicates through a tube in the nest with a fill chamber defined by the space between the back of the nest and the wafer, the intercommunicating spaces being filled with hydraulic fluid whereby movement of the barrier diaphragm in response to an applied pressure is hydraulically transmitted to the sensing diaphragm to produce a force which deflects the beam.

7 Claims, 4 Drawing Figures

PRESSURE SENSING CELL FOR FORCE-BALANCE TRANSMITTER

BACKGROUND OF INVENTION

This invention relates generally to pressure sensors for force-balance transmitters, and more particularly to a self-contained pressure sensing cell which may be coupled to the force beam of the transducer section of the transmitter and which may readily be replaced without disturbing this section.

Transmitters for measuring absolute, gauge or differential pressure which operate on the principles of force-balance are well known in the art. One commercially-available instrument of the force-balance type is the Pressure-to-Pneumatic Transmitter Series 50 PW 1000 manufactured by the Fischer & Porter Company of Warminster, Pa. and described in the 1978 Instruction Bulletin 50 PW 1000, Revision 2, published by this company.

In a transmitter of this type a Bourdon tube or bellows, depending on the pressures to be measured, acts to sense the process pressure. This sensor is directly coupled to one end of a pivoted force beam and produces a torque directly proportional to the applied pressure. An equal and opposite force from a feedback system is applied to the other end of the beam, this opposing force being generated by a feedback bellows that measures the transmitter output pressure.

When measuring differential pressure, a second Bourdon tube or bellows is used to sense the lesser of the two measured pressures. This second pressure sensor is mounted in opposition to the first sensor so that the force beam detects only the differential value. When measuring absolute pressure, the second sensor is evacuated and sealed, so that the pressure applied to the first sensor is compared to a zero reference rather than atmospheric pressure.

The above-described Series 50 PW 1000 instrument yields a pneumatic signal in the 3–15 PSIG range directly proportional to the measured process pressure. Transmitters are also commercially available which convert pressure into corresponding electrical values. One such instrument is the Series 50 EP 1000 transmitter also manufactured by Fischer & Porter and described in their 1978 Instruction Bulletin 50 EP 1000-C, Revision 5.

This electrical instrument also operates on force-balance principles to produce an output current in a useful industrial process control range (i.e., 4, to 20 mAdc or 10 to 50 mAdc). In this instrument, the opposing torque applied to the force beam is produced by a force motor that measures the transmitter's output current. U.S. Pat. Nos. 3,564,923 and 3,832,618 are representative of prior art force-balance transmitters of the electrical type, while U.S. Pat. No. 3,742,969 describes a force-balance transmitter of the pneumatic type.

The primary concern of the present invention is with a pressure sensor responsive to an input pressure to produce a corresponding force. Pressure sensors for force-balance transmitters which make use of conventional bellows or convoluted diaphragms have limited use in pressure applications over 1,000 psi. Their sizes are such that the forces generated by the sensors, as determined by their P/F ratio characteristics, are too high for the standard industrial type of force-balance transducer.

In one well-known differential-pressure transmitter manufactured and sold by Fischer & Porter of Warminster, Pa., and described in their Instruction Bulletin 50 DP 3000 Revision 3 (March 1978), two related pressure inputs are applied to high and low pressure chambers incorporated in the meter body. A convoluted sensing diaphragm in each chamber acts to sense the applied input pressure and to convert it to a force equal to the product of the pressure and the effective area of the diaphragm. These two forces are then projected in opposite directions to the lower end of the pivoted force beam through diaphragm pins. The resultant differential force generates a torque causing the force beam to swing through a relatively small angle about a sealing diaphragm functioning as a fulcrum.

In this Fischer & Porter transmitter, the two sensing diaphragms are welded to the meter body block to define a single internal chamber that is filled with a damping fluid. This fluid influences the dynamic response characteristics of the sensors and acts as an hydraulic back-up to protect the diaphragm under high static pressure.

As pointed out previously, convoluted diaphragm pressure sensors are unsuitable for very high psi pressure levels. But another drawback of such sensors is that they have a limited life, particularly when exposed to corrosive fluids. When it becomes necessary to replace a sensor in a differential pressure transmitter installation, this cannot be done in the field; for the diaphragms are welded to the meter body and the sensors are structurally integrated with the transducer section of the transmitter. Hence one must return the entire transmitter to the shop to replace the sensors, as a result of which the transmitter may be out of service for a prolonged period.

Bourdon tube pressure sensors are available which have P/F ratio characteristics suitable for high pressure applications up to psi levels as high as 10,000 to 20,000. But because of their physical shape, Bourdon tube sensors tend to trap impurities as well as the condensed moisture encountered in other than ideal process wetted applications. To eliminate these problems, chemical seals are often employed, but such sealing expedients add appreciably to the cost of the sensor.

SUMMARY OF INVENTION

In view of the foregoing, the main object of this invention is to provide improved pressure sensors for force-balance transmitters, which sensors have high ratio pressure/force characteristics that render the sensors effective at high pressure levels.

More particularly, an object of this invention is to provide a relatively inexpensive pressure sensor of the flat diaphragm type having P/F characteristics comparable to that of a Bourdon tube sensor but possessing isolation and chemical sealing properties lacking in Bourdon tube sensors, whereby the sensor is useful in high pressure applications involving corrosive or dangerous media.

Yet another object of this invention is to provide a pressure sensor which takes the form of a self-contained cell that may readily be coupled to the force beam of the transducer section of a differential pressure transmitter or detached therefrom, the cell constituting a "throw-away" unit thereby making possible the replacement of defective sensors in the field.

Briefly stated, these objects are attained in a self-contained pressure-sensing cell in accordance with the invention, the cell producing a force in response to an applied input pressure for deflecting the pivoted beam in the transducer section of a transmitter which converts the pressure into a corresponding signal. The cell includes a housing that is seatable within a well formed in the meter body of the transmitter and communicating with a chamber therein into which the lower end of the beam is extended.

The cell housing is divided into a rear section, a mid section and a front section. Disposed within the rear section and integral with the wall thereof at its junction with the mid section is a thin wafer functioning as a flat sensing diaphragm. The flat diaphragm is provided with a connector pin that projects into the body chamber and is joinable to the beam whereby deflection of the flat diaphragm results in a corresponding beam deflection.

Supported within the front section of the housing adjacent the mouth thereof is a convoluted barrier diaphragm behind which is a back-up nest that is seated with the front section. The free space between the face of the nest and the barrier diaphragm communicates through a duct in the nest and the wafer, the intercommunicating spaces being filled with hydraulic fluid whereby deflection of the barrier diaphragm in response to an applied pressure is hydraulically transmitted to the sensing diaphragm to produce a force which deflects the beam.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
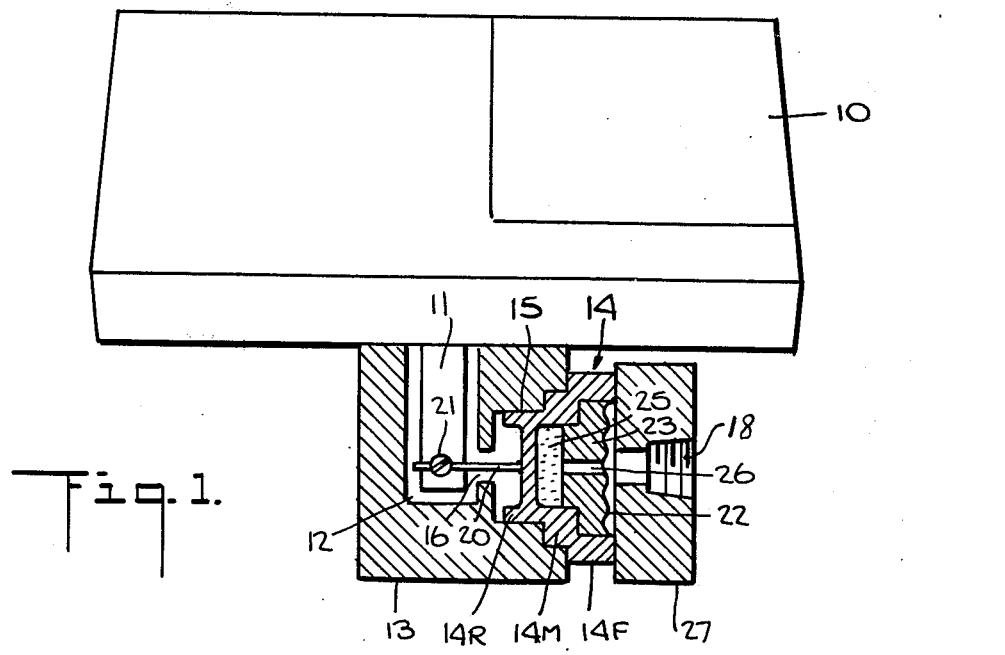
FIG. 1 is a sectional view of a pressure-sensing cell in accordance with the invention, the cell being operatively coupled to the pivoted beam of the transducer section of a standard pressure transmitter.
Figure 2:
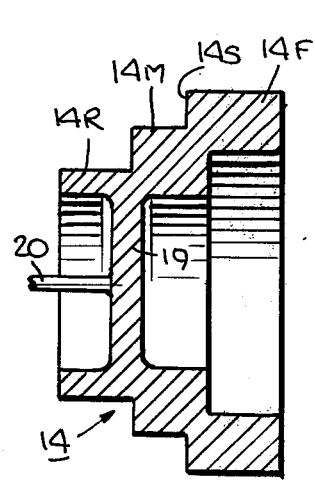
FIG. 2 is a section taken through the housing of the cell.
Figure 3:
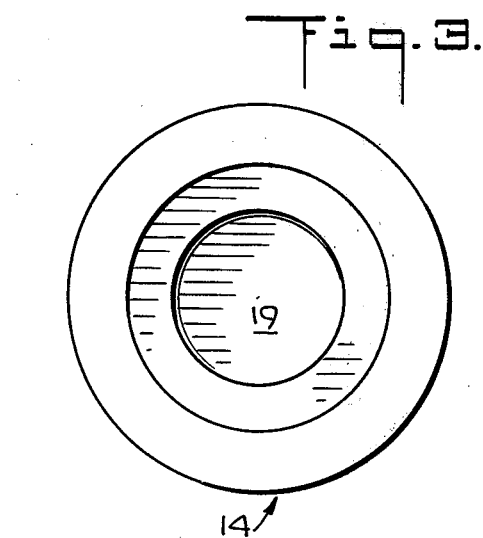
FIG. 3 is a plan view of the housing.
Figure 4:
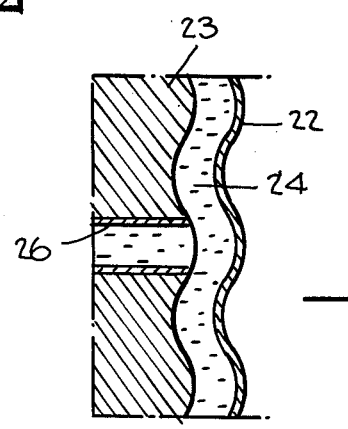
FIG. 4 is a detail of FIG. 1.

Referring now to FIG. 1, there is shown a pressure transmitter which includes a transducer section 10 generally of the type disclosed in the above-identified Fischer & Porter instruments or of any other known type operating on the force-balance principle to produce a pneumatic or electrical output signal as a function of the applied pressures. The transducer section includes a pivoted force beam 11 whose lower end extends into the chamber 12 of a meter body 13, as well as the usual beam-motion detector and a motor or bellows in a negative feedback loop to produce a counter-balancing torque.

A pressure-sensing cell in accordance with the invention includes a cylindrical housing 14, machined of metal stock such as aluminum or stainless steel, the housing having a stepped formation which effectively divides the housing into a small-diameter rear section 14R, an intermediate-diameter mid-section 14M and a large-diameter front section 14F. Meter body 13 is provided with a lateral well or socket 15 which communicates by way of a passage 16 with force-beam chamber 12. The well has a stepped formation which complements that of the cell housing, making it possible to seat cell housing 14 neatly within the well, with the shoulder 14S of the housing resting against the side wall of the meter body. Housing 14 is sandwiched between the meter body and a process flange 27 having an opening 18 therein through which the process fluid to be metered is admitted.

Disposed within rear section 14R of the cell housing is a flat circular section or wafer 19, preferably having a uniform thickness, the wafer being integral with the wall of the rear section adjacent its junction with mid section 14M. The junction of wafer 19 and the wall of the mid section has a fillet radius to enhance the compliance of the wafer 19 which functions as a flat sensing diaphragm. Wafer 19 is provided with a connector pin 20 which is joined at one end to the center of the wafer and projects through passage 16 into the body chamber 12 where its free end is joinable by a screw 21 or other means to the lower portion of force beam 11.

Supported within front section 14F adjacent the mouth thereof is a convoluted barrier diaphragm 22 which is peripherally welded or otherwise bonded to the wall of this housing section. Behind diaphragm 22 and slightly spaced therefrom is the face of a back-up nest 23. This face is similarly convoluted whereby the free space 24 between the nest face and diaphragm 22 has a convoluted formation. Nest 23, which also has a stepped formation, is seated within front section 14F, the base of the nest projecting into mid section 14M to define a fill chamber 25 in the space between the rear of the nest and wafer 19. Nest 23 is provided with a center tube 26 which brings free space 26 into communication with fill chamber 25, the interconnecting spaces being filled with an hydraulic fluid.

Thus wafer 19 serving as a sensing diaphragm is an integral part of housing 14 which is provided with a barrier diaphragm 22 to isolate the sensing diaphragm from the process fluid, thereby protecting wafer 19 from corrosive fluids. Pressure applied to barrier diaphragm 22 is transmitted by the hydraulic fluid to sensing diaphragm 19, causing the center of the sensing diaphragm to deflect in a linear manner to an extent sufficient to actuate the force-balance transducer 10 through connector pin 20.

In a conventional force-balance transmitter, the product of the process pressure and the effective area of the convoluted diaphragm in the sensor produces a force capable of being rebalanced by an equal but opposite force generated in the feedback loop of the transducer, so that the only motion required by the system is that necessary to effect a swing of the force beam detector in the feedback loop.

In the present arrangement, in which the sensing diaphragm is not a convoluted diaphragm but a flat wafer, the high force generated by the pressure-effective area relationship created by the convoluted barrier diaphragm is absorbed in deflecting the circular section of the wafer to an extent sufficient to actuate the detector. The feedback force resulting from the linear deflection of the detector is well below the level of a theoretically equal but opposite force, but it is proportionally related to the applied input pressure. Bending of the connector pin 20 permits the system to return to its null position.

Because all components of the pressure-sensing cell are contained in housing 14 except for connector pin 20 which projects outside of the cell the cell is a self-contained unit and may be put in service simply by seating the housing of the cell within well 15 of the meter body and tightening screw 21 to join the free end of the pin to the force beam. To replace the cell, one simply lossens screw 21, making it possible to withdraw the cell from the well. Thus in practice, the cell can be treated as a throw-away unit, which can be replaced in the field without disturbing the transducer section of the transmitter. Obviously, in the case of a differential transmitter, two such cells will be used.

While there has been shown and described a preferred embodiment of a pressure sensing cell for force-balance transmitter in accordance with the invention, it will be appreciated that many changes and modifications may be made therein, without, however, departing from the essential spirit thereof. Thus in practice nest 23 need not be convoluted but may be flat.

I claim:

1. A pressure-sensing cell responsive to an applied input pressure to produce a force for deflecting the pivoted force beam in the transducer section of a transmitter adapted to convert the pressure into an output signal, the transmitter having a meter body provided with a chamber into which the low end of the beam extends and a side socket communicating with the beam chamber, said cell comprising:

A. a housing seatable in said socket and divided into a rear section, a mid section and a front section;
   B. a wafer disposed within said rear section and integral with the wall thereof at its junction with the mid section, said wafer functioning as a sensing diaphragm and having a connector pin that projects into the body chamber and is joinable to the beam whereby deflection of the sensing diaphragm results in a corresponding beam deflection;
   C. a barrier diaphragm supported within the front section adjacent the mouth thereof; and
   D. a back-up nest seated within the front section, the face of the nest being spaced from the barrier diaphragm to form a free space which communicates through a tube in the nest with a fill chamber defined by the space between the back of the nest and the wafer, the intercommunicating spaces being filled with hydraulic fluid whereby movement of the barrier diaphragm in response to an applied pressure is hydraulically transmitted to the sensing diaphragm to produce a force which deflects the beam.

2. A cell as set forth in claim 1, wherein said housing is a cylinder having a stepped formation to define said sections whereby said rear section has a small diameter, said mid section has an intermediate diameter, and said front section has a large diameter, said socket having a complementary stepped formation.

3. A cell as set forth in claim 1, wherein said housing and said wafer are machined of a metal piece.

4. A cell as set forth in claim 1, wherein said barrier diaphragm has a convoluted form and the face of said nest has a complementary formation.

5. A cell as set forth in claim 1, wherein said housing is sandwiched between said meter body and a process flange.

6. A cell as set forth in claim 1, wherein said housing at the junction of said wafer and said mid section has a fillet radius to enhance the compliance of the wafer.

7. A cell as set forth in claim 1, wherein said transducer includes a feedback loop to apply a rebalancing torque to said beam.

* * * * *